United States Patent [19]
Plumb et al.

[11] Patent Number: 6,133,996
[45] Date of Patent: Oct. 17, 2000

[54] LASER EQUIPED LEVEL DEVICE

[76] Inventors: Keith L. Plumb, 44 Parthia Close, Tadworth, Surrey KT20 5LB; Michael J. Smith, 98, Agar Road, Illogan Highway, Redruth, Cornwall TR15 3NE, both of United Kingdom

[21] Appl. No.: 09/151,819

[22] Filed: Sep. 11, 1998

[30] Foreign Application Priority Data

Sep. 12, 1997 [GB] United Kingdom ............ 9719513

[51] Int. Cl.$^7$ .............................. G01C 1/00; G01B 11/26
[52] U.S. Cl. ........................................ 356/138; 33/273
[58] Field of Search ............................ 356/138, 147, 356/198; 33/272, 273, 274, 227, 290, 291, 292

[56] References Cited

U.S. PATENT DOCUMENTS

| | | | |
|---|---|---|---|
| 4,852,265 | 8/1989 | Rando et al. | 33/227 |
| 4,912,851 | 4/1990 | Rando et al. | 33/227 |
| 5,075,977 | 12/1991 | Rando | 33/227 |

*Primary Examiner*—Frank G. Font
*Assistant Examiner*—Michael P. Stafira

[57] ABSTRACT

A laser equipped level assembly is provided including a linear member and a laser mounted on the linear member for emitting a beam of light therefrom. Also included is a pendulum for allowing the emission of the beam of light only when the linear member is level.

12 Claims, 6 Drawing Sheets

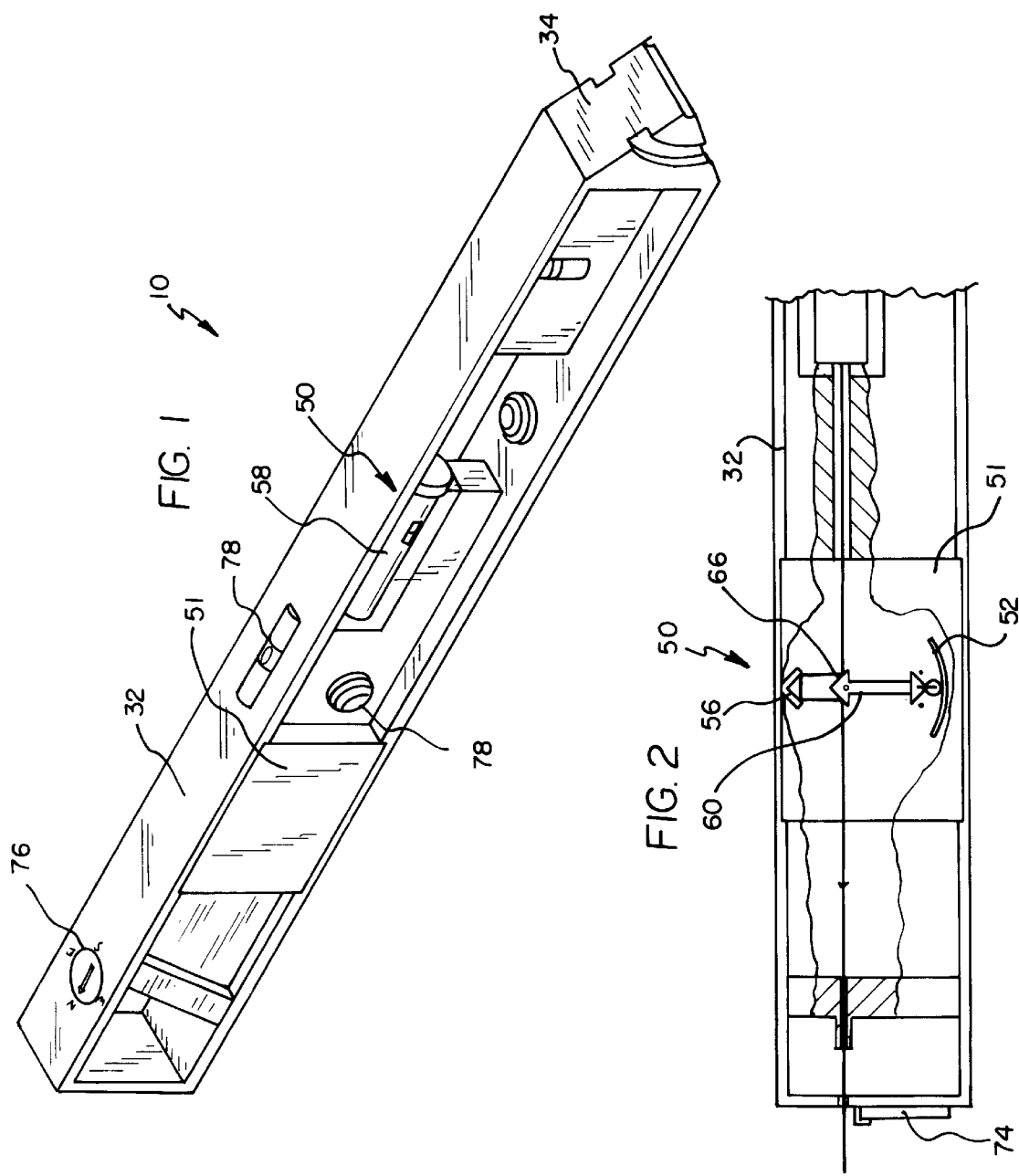

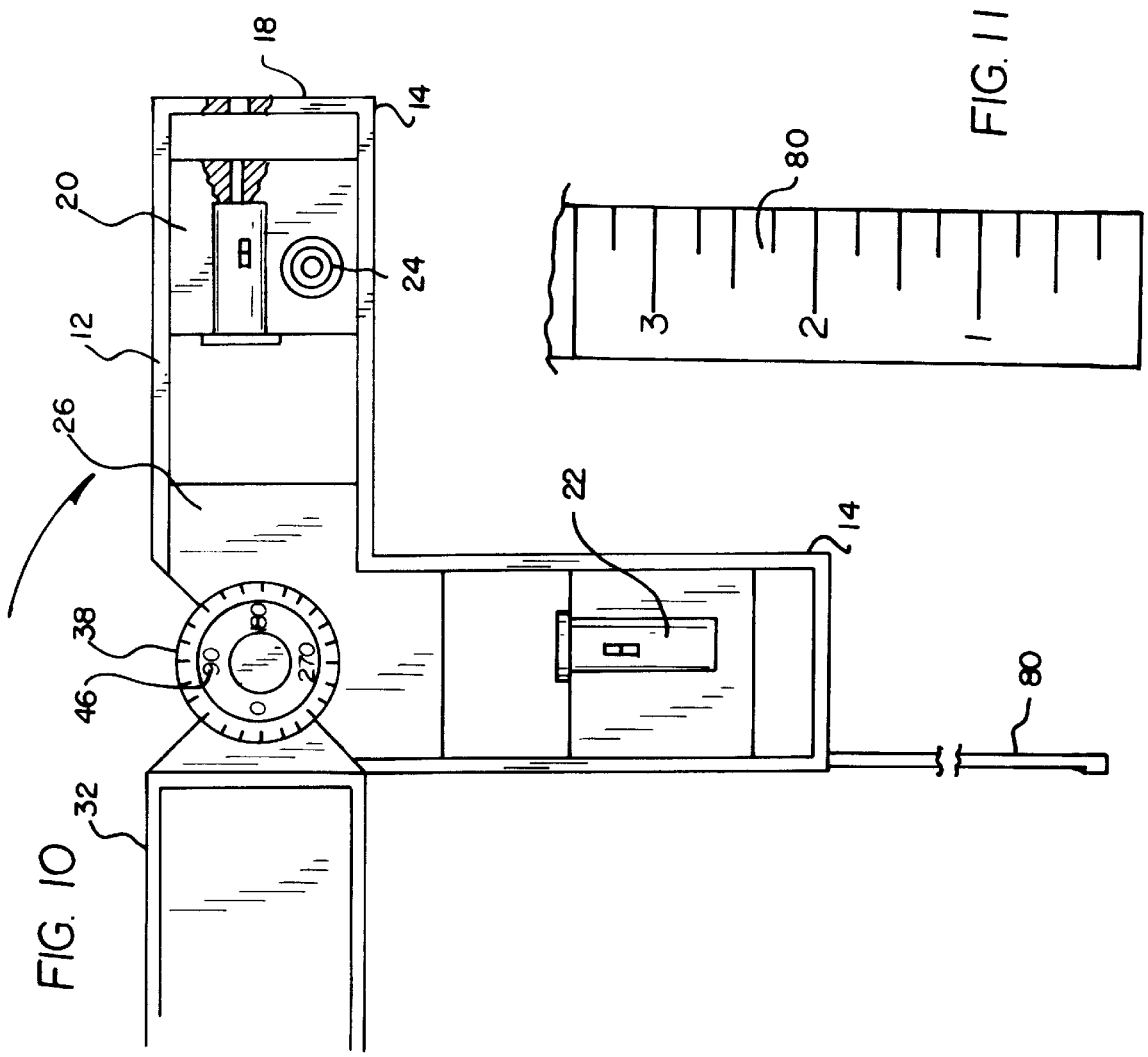

LASER EQUIPED LEVEL DEVICE

BACKGROUND OF THE INVENTION

1. Related Application

This application is based on an application filed in the United Kingdom on Sep. 12, 1997 under application serial number 9719513.5.

2. Field of the Invention

The present invention relates to level assemblies and more particularly pertains to a new laser equiped level device for only allowing the emission of a laser from a level when the same is horizontally oriented.

3. Description of the Prior Art

The use of level assemblies is known in the prior art. More specifically, level assemblies heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes level assemblies U.S. Pat. No. 5,459,932; U.S. Pat. No. 5,531,031; U.S. Pat. No. 5,561,911; U.S. Pat. No. 3,044,173; U.S. Pat. No. 3,988,837; and U.S. Pat. No. Des. 389,758.

In these respects, the laser equiped level device according to the present invention substantially departs from the conventional concepts and designs of the prior art, and in so doing provides an apparatus primarily developed for the purpose of allowing the emission of a laser from a level when the same is horizontally oriented.

SUMMARY OF THE INVENTION

In view of the foregoing disadvantages inherent in the known types of level assemblies now present in the prior art, the present invention provides a new laser equiped level device construction wherein the same can be utilized for allowing the emission of a laser from a level when the same is horizontally oriented.

The general purpose of the present invention, which will be described subsequently in greater detail, is to provide a new laser equiped level device apparatus and method which has many of the advantages of the level assemblies mentioned heretofore and many novel features that result in a new laser equiped level device which is not anticipated, rendered obvious, suggested, or even implied by any of the prior art level assemblies, either alone or in any combination thereof.

To attain this, the present invention generally comprises a right angle portion having a pair of members. As shown in FIG. 8, each member is defined by a pair of planar rectangular side plates integrally coupled in parallel relationship at a first end via an end plate. Second ends of the members are integrally coupled such that the members form a 90 degree angle. Each member includes a block mounted adjacent a central extent thereof with a bore formed therein. This bore is adapted for removably accepting a laser which emits a beam of light through a bore formed in the end face of the member. At least one of the members of the right angle portion has a bubble level indicator mounted on its side face. Further, the second ends of the members of the right angle portion include an L-shaped block with a beveled corner. Such beveled corner has a pair of side faces each with an annular groove formed therein. Formed between the side faces and in concentric relationship with the annular grooves is a central liner recess, as shown in FIG. 12. Next provided is a linear portion with a length at least twice that of the members of the right angle portion. The linear portion includes a pair of planar rectangular side plates integrally coupled in parallel relationship at a first end via an end plate. As shown in FIGS. 1 and 12, the linear portion has a second end with a prism defined by a pair of converging beveled end faces and a pair of side faces each with an annular protrusion formed therein. At least one of the side faces of the prism has an indent formed therein. FIG. 12 best shows a pivoting assembly including a pair of disks. Each of the disks has an aperture formed in a central extent thereof. Further, a first side face of each disk is equipped with an annular protrusion and a detent. A second side face of each disk has indicia positioned thereon for reasons that will soon become apparent. With continuing reference to FIG. 12, the pivoting assembly also includes a bolt slidably situated within the apertures of the disk. As such, the annular protrusions of the disk are slidably situated within the annular grooves of the right angle portion and the linear portion. Further, the detent is received within the indent of the linear portion to maintain a fixed relative relationship. In use, the right angle portion is pivotable with respect to the linear portion within a single plane. Also, a respective angle between the portions is indicated by the indicia of the disks. As best shown in FIGS. 2 and 3, a laser assembly is provided including a compartment mounted on a central extent of the linear portion. Such compartment is equipped with a concave guide mounted on a bottom inner face thereof. Further, a pair of laterally spaced pin holes are formed in one of the side faces of the compartment. These pin holes flank a bottommost dip in the concave guide for reasons that will soon become apparent. Further, a pair of mirrors are mounted at a right angle with respect to each other on a top inner face thereof and directed downwardly. The laser assembly further includes a laser mounted between the side plates of the linear portion adjacent the compartment. In use, the laser serves for directing a beam of light through apertures formed in the compartment and the end plate. Such beam of light is directed away from the linear portion in coaxial relationship therewith. The laser assembly is also equipped with a pendlem having a top end pivotally coupled about a laterally extending horizontal axis within the compartment. A bottom end of the pendulum has a pair of arms extending downwardly therefrom between which a free spinning spherical ball is rotatably mounted. This ball is adapted for rolling freely on the concave guide. Finally, a pair of mirrors are mounted at a right angle with respect to each other on the top end of the pendulum and directed upwardly. In operation, a beam of light is emitted from the linear portion only upon the same being level such that the beam of light may reflect between both pairs of mirrors. Also included is a U-shaped fastener which may be removably mounted within the pin holes of the compartment. When the U-shape fastener is employed, the mirrors are maintained in alignment to effect the unconditional passage of the beam of light.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new laser equiped level device apparatus and method which has many of the advantages of the level assemblies mentioned heretofore and many novel features that result in a new laser equiped level device which is not anticipated, rendered obvious, suggested, or even implied by any of the prior art level assemblies, either alone or in any combination thereof.

It is another object of the present invention to provide a new laser equiped level device which may be easily and efficiently manufactured and marketed.

It is a further object of the present invention to provide a new laser equiped level device which is of a durable and reliable construction.

An even further object of the present invention is to provide a new laser equiped level device which is susceptible of a low cost of manufacture with regard to both materials and labor, and which accordingly is then susceptible of low prices of sale to the consuming public, thereby making such laser equiped level device economically available to the buying public.

Still yet another object of the present invention is to provide a new laser equiped level device which provides in the apparatuses and methods of the prior art some of the advantages thereof, while simultaneously overcoming some of the disadvantages normally associated therewith.

Still another object of the present invention is to provide a new laser equiped level device for allowing the emission of a laser from a level when the same is horizontally oriented.

Even still another object of the present invention is to provide a new laser equiped level device that includes a linear member and a laser mounted on the linear member for emitting a beam of light therefrom. Also included is a pendulum for allowing the emission of the beam of light only when the linear member is level.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new laser equiped level device according to the present invention.

FIG. 2 is a front view of the laser assembly of the present invention.

FIG. 10 is a side view of the linear portion of the present invention oriented in manner different from that shown in FIG. 8.

FIG. 11 is a top view of the ruler of the present invention.

DESCRIPTION OF THE PREFERRED EMBODIMENT

Figure 3:
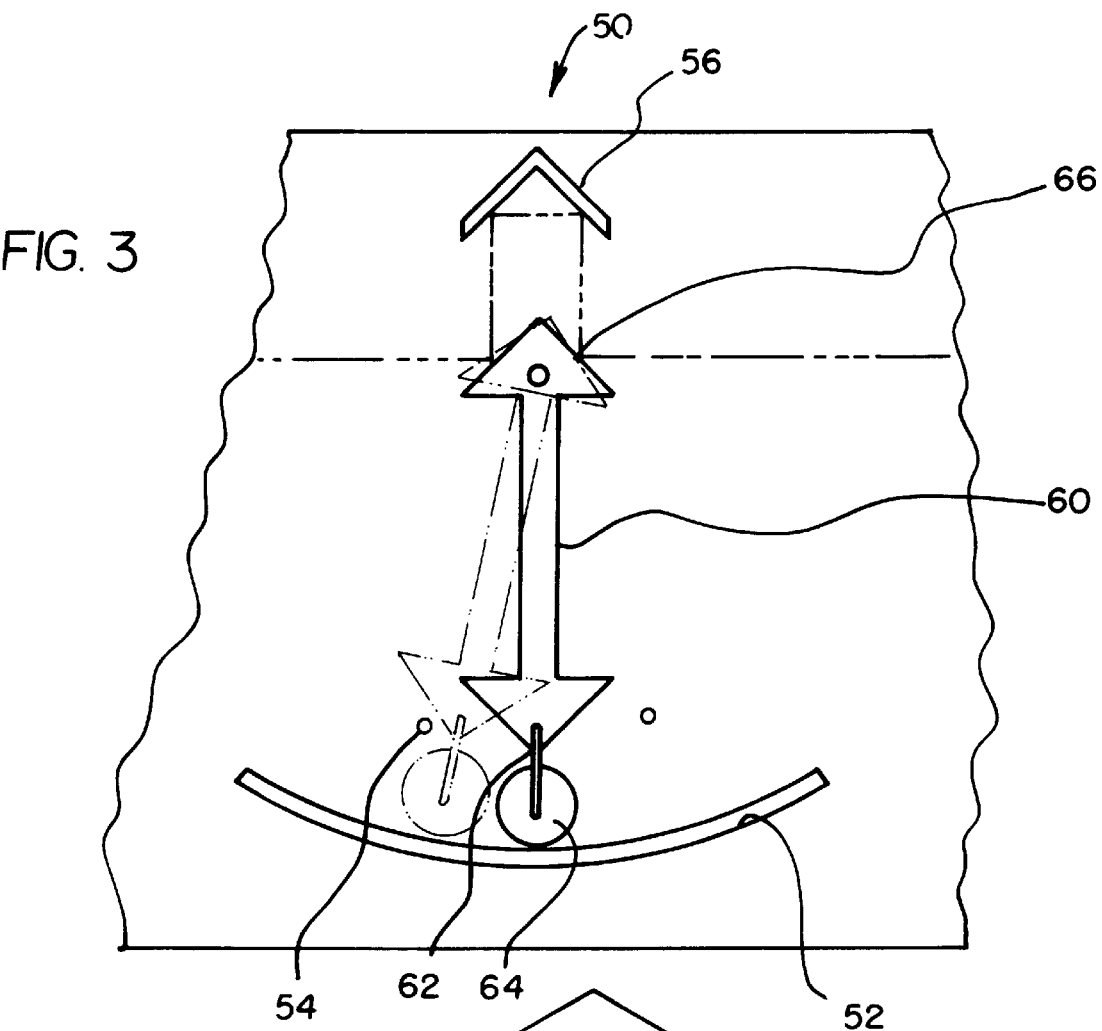
FIG. 3 is a detailed view of the laser assembly of the present invention shown in FIG. 2.
Figure 4:
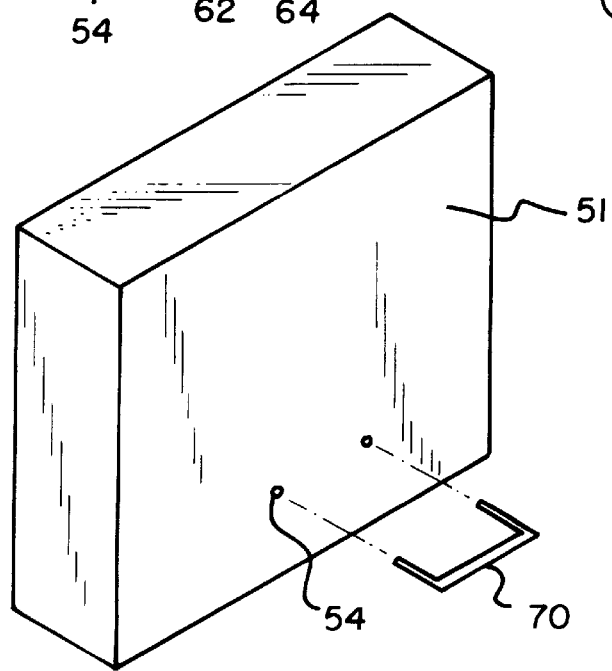
FIG. 4 is a perspective view of the U-shaped fastener of the present invention during use.
Figure 5:
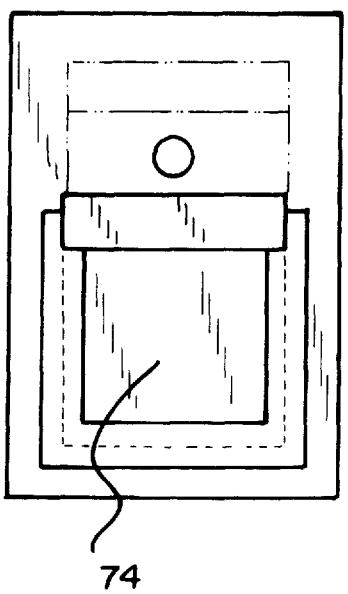
FIG. 5 is an end view of the linear portion of the present invention showing the slider door thereof.

With reference now to the drawings, and in particular to FIGS. 1 through 13 thereof, a new laser equiped level device embodying the principles and concepts of the present invention and generally designated by the reference numeral 10 will be described.

Figure 8:
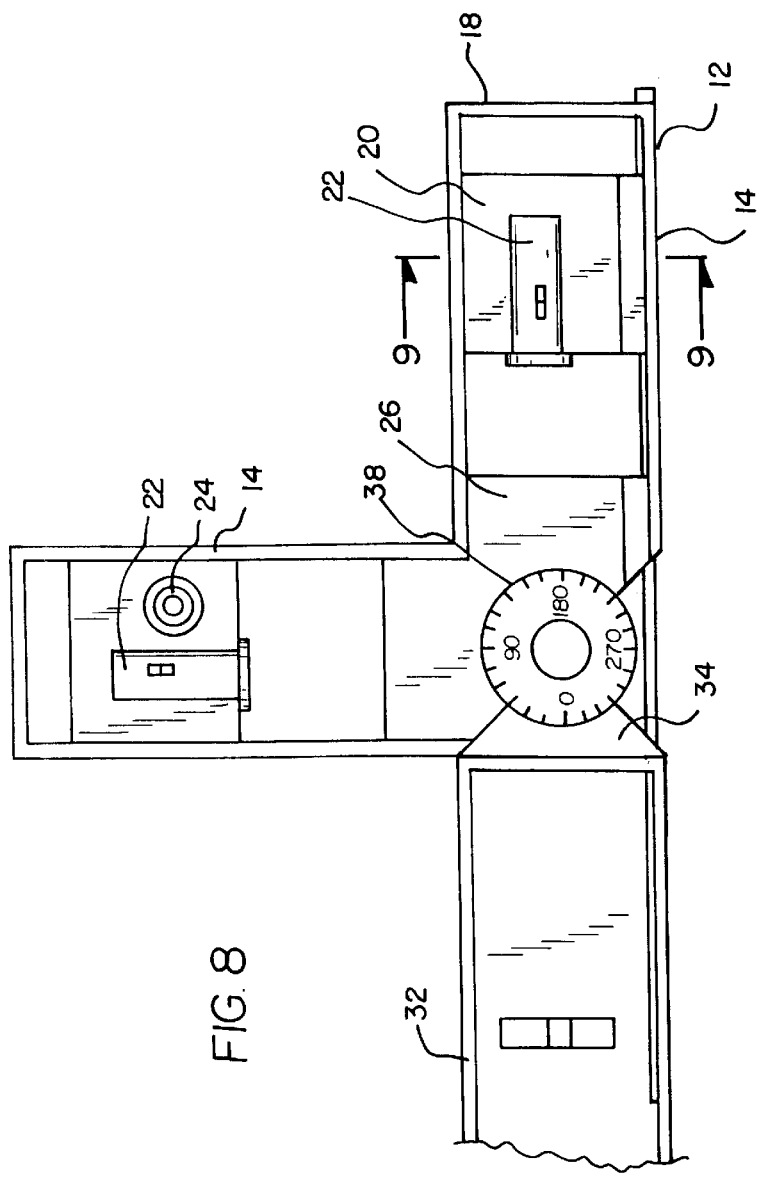
FIG. 8 is a side view of the interconnection between the linear portion and the right angle portion of the present invention.
Figure 9:
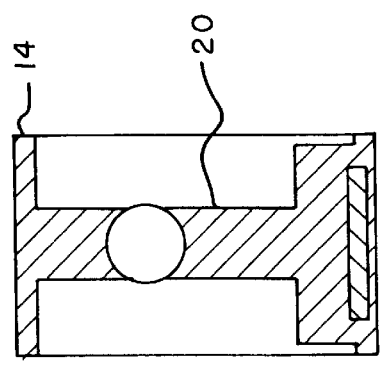
FIG. 9 is a cross-sectional view of the present invention taken along line 9—9 shown in FIG. 8.

The present invention, designated as numeral 10, includes a right angle portion 12 having a pair of members 14. As shown in FIG. 8, each member is defined by a pair of planar rectangular side plates 16 integrally coupled in parallel relationship at a first end via an end plate 18. Second ends of the members are integrally coupled such that the members form a 90 degree angle. Each member includes a block 20 mounted adjacent a central extent thereof with a bore formed therein. This bore is adapted for removably accepting a laser 22 which emits a beam of light through a bore formed in the end face of the member.

At least one of the members of the right angle portion has a bubble level indicator 24 mounted on its side face. Further, the second ends of the members of the right angle portion include an L-shaped block 26 with a beveled corner. Such beveled corner has a pair of side faces each with an annular groove 28 formed therein. Formed between the side faces and in concentric relationship with the annular grooves is a central liner recess 30, as shown in FIG. 12.

Next provided is a linear portion 32 with a length at least twice that of the members of the right angle portion. The linear portion includes a pair of planar rectangular side plates integrally coupled in parallel relationship at a first end via an end plate, similar to the members of the right angle portion. As shown in FIGS. 1 and 12, the linear portion has a second end with a prism 34 defined by a pair of converging beveled end faces and a pair of side faces each with an annular protrusion formed therein. At least one of the side faces of the prism has an indent formed therein.

Figure 12:
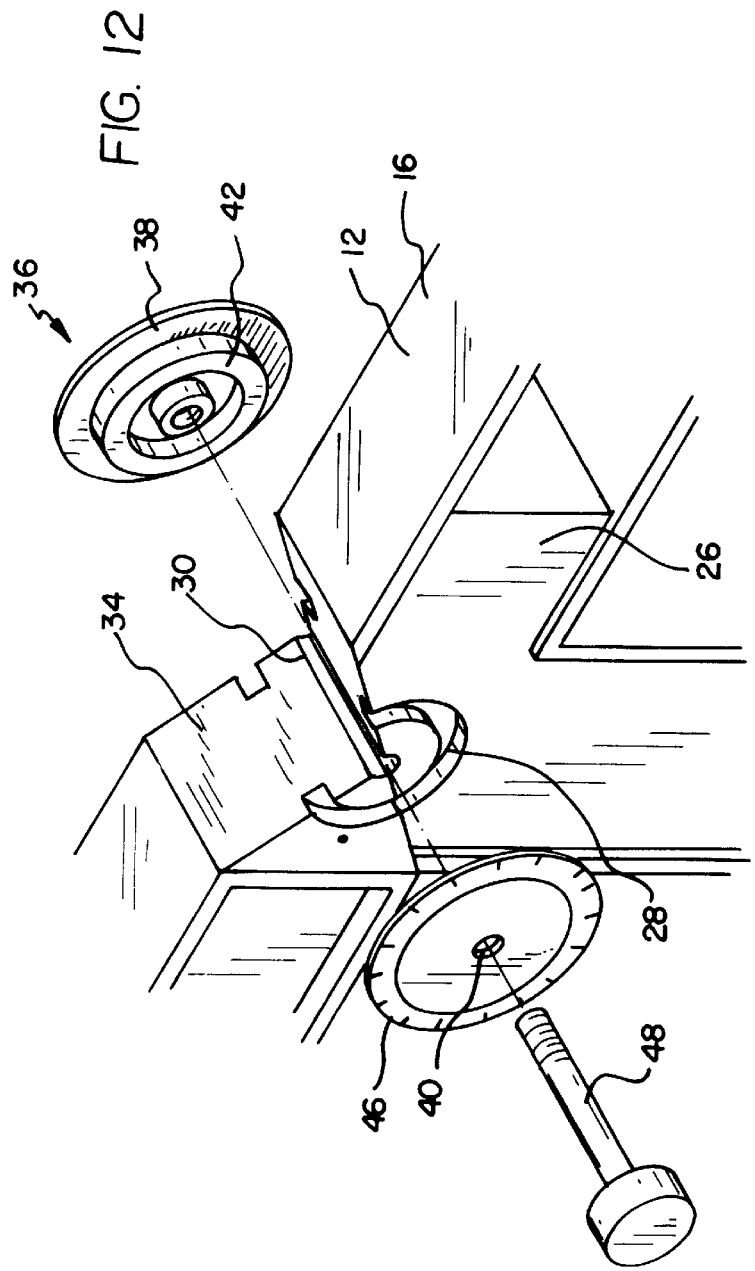
FIG. 12 is a perspective view of the pivoting assembly between the linear portion and the right angle portion of the present invention.
Figure 13:
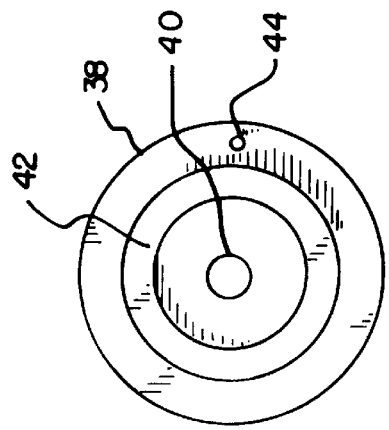
FIG. 13 is an end view of the one of the disks of the pivoting assembly shown in FIG. 12.

FIG. 12 best shows a pivoting assembly 36 including a pair of disks 38. Each of the disks has an aperture 40 formed in a central extent thereof. Further, a first side face of each disk is equipped with an annular protrusion 42 and a detent 44. A second side face of each disk has indicia 46 positioned thereon for reasons that will soon become apparent.

With continuing reference to FIG. 12, the pivoting assembly also includes a bolt 48 slidably situated within the apertures of the disk. As such, the annular protrusions of the disk are slidably situated within the annular grooves of the right angle portion and the linear portion. Further, the detent is received within the indent of the linear portion to maintain a fixed relative relationship. In use, the right angle portion is pivotable with respect to the linear portion within a single plane. Also, a respective angle between the portions is indicated by the indicia of the disks.

As best shown in FIGS. 2 and 3, a laser assembly 50 is provided including a compartment 51 movably mounted on a central extent of the linear portion. Such compartment is equipped with a concave guide 52 mounted on a bottom inner face thereof. Further, a pair of laterally spaced pin holes 54 are formed in one of the side faces of the compartment. These pin holes flank a bottommost dip in the concave guide for reasons that will soon become apparent. Further, a pair of mirrors 56 are mounted at a right angle with respect to each other on a top inner face of the compartment and directed downwardly.

Figure 6:
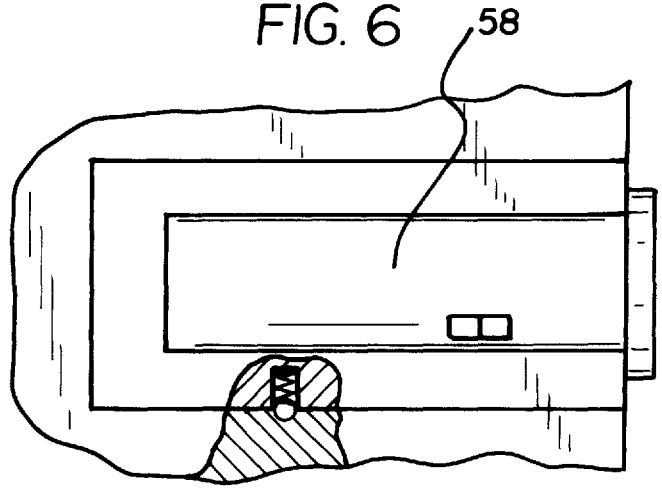
FIG. 6 is a side view of the laser of the laser assembly of the present invention.

The laser assembly further includes a switch-actuated laser 58 encased in a block which is removably mounted between the side plates of the linear portion adjacent the compartment. As shown in FIG. 6, the laser is maintained in place by way of a spring biased ball bearing. In use, the laser serves for directing a beam of light through apertures formed in the compartment and the end plate. Such beam of light is directed away from the linear portion in coaxial relationship therewith. The laser assembly is also equipped with a pendlem 60 having a top end pivotally coupled about a laterally extending horizontal axis within the compartment. A bottom end of the pendulum has a pair of arms 62 extending downwardly therefrom between which a free spinning spherical ball 64 is rotatably mounted. This ball is adapted for rolling freely on the concave guide. In an alternate embodiment, a simply weight may be positioned on the pendulum. Finally, a second pair of mirrors 66 are mounted at a right angle with respect to each other on the top end of the pendulum and directed upwardly.

Figure 7:
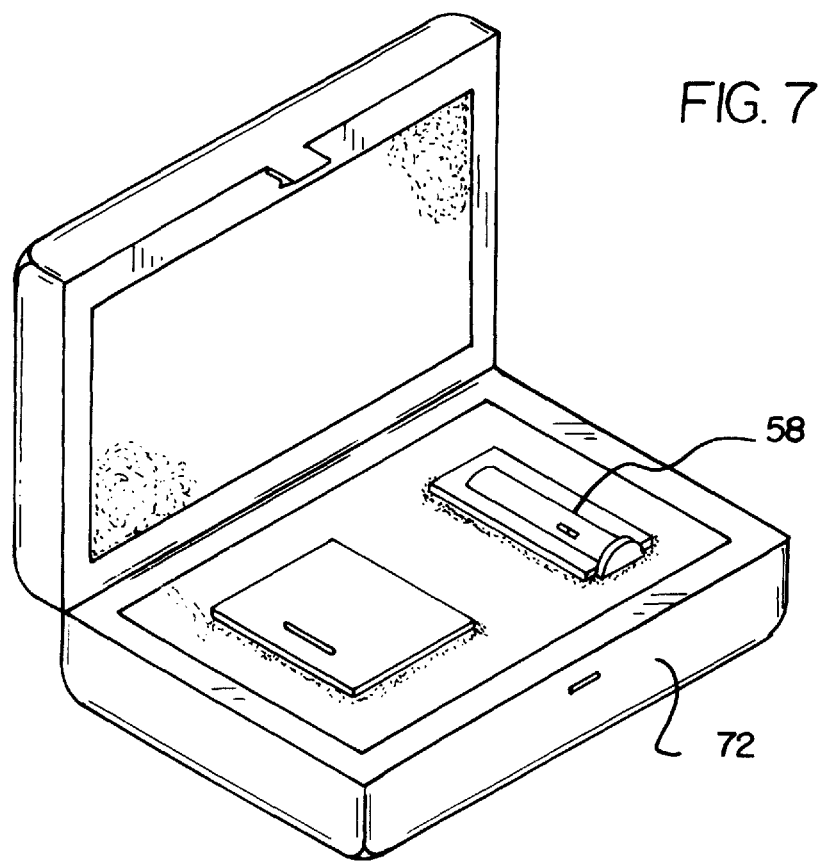
FIG. 7 is a perspective view of an optional carrying case for carrying the removable laser assembly.

In operation, a beam of light is emitted from the linear portion only upon the same being level such that the beam of light may reflect between both pairs of mirrors. Note FIG. 2. It should be noted that any other type of pendulum type mechanism or the like may be employed to accomplish the forgoing function. Also included is a U-shaped fastener 70 which may be removably mounted within the pin holes of the compartment. When the U-shape fastener is employed, the mirrors are maintained in alignment to effect the unconditional passage of the beam of light. The U-shaped fastener is also critical for when the compartment is transported. As shown in FIG. 7, a case 72 may be included for transporting the removable laser and compartment of the laser assembly.

For selectively allowing the passage of the beam of light from the linear portion, a sliding door 74 is slidably mounted on the end plate of the linear portion for being manually maneuvered. In a first orientation, the aperture of the end plate is covered. Further, in a second orientation, the sliding door serves for opening the aperture of the end plate, thereby allowing the passage of the beam of light.

Further features include a compass 76 mounted on one of the side plates of the linear portion adjacent the end plate for indicating a northerly direction. Also provided are a plurality of bubble level indicators 78 mounted on the linear portion along a longitudinal axis thereof. As is conventional, the bubble level indicator is adapted for indicating whether the linear portion is level. Lastly, as shown in FIGS. 10 & 11, an 18 inch steel bar ruler 80 is slidably situated within a slot formed in one of the members of the right angle portion for measuring purposes.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A laser equipped level assembly comprising, in combination:

a right angle portion including a pair of members each having a pair of planar rectangular side plates integrally coupled in parallel relationship at a first end via an end plate, wherein second ends of the members are integrally coupled such that the members form a 90 degree angle, each member including a block mounted adjacent a central extent thereof with a bore formed therein for removably accepting a laser which emits a beam of light through a bore formed in the end face of the member, at least one of the members having a bubble level indicator mounted on a side face thereof, the second ends of the members of the right angle portion further including an L-shaped block with a beveled corner having a pair of side faces each with an annular groove formed therein and a central liner recess formed between the side faces in concentric relationship with the annular grooves;

a linear portion with a length at least twice that of the members of the right angle portion and including a pair of planar rectangular side plates integrally coupled in parallel relationship at a first end via an end plate, the linear portion having a second end with a prism defined by a pair of converging beveled end faces and a pair of side faces each with an annular protrusion formed therein and at least one of which has an indent protruding therefrom;

a pivoting assembly including a pair of disks each having an aperture formed in a central extent thereof, a first side face with an annular protrusion and a detent coupled thereto and extending therefrom, and a second side face having indicia positioned thereon, the pivoting assembly further including a bolt slidably situated within the apertures of the disk such that the annular protrusions of the disk are slidably situated within the annular grooves of the right angle portion and the linear portion and further the detent is received within the indent of the linear portion, wherein the right angle portion is pivotable with respect to the linear portion within a single plane and further a respective angle between the portions is indicated by the indicia of the disks;

a laser assembly including a compartment mounted on a central extent of the linear portion and having a concave guide mounted on a bottom inner face thereof, a pair of laterally spaced pin holes formed in one of the side faces which flank a bottommost dip in the concave guide, and a pair of mirrors mounted at a right angle with respect to each other on a top inner face thereof and directed downwardly, the laser assembly further including a laser mounted between the side plates of the linear portion adjacent the compartment for directing a beam of light through apertures formed in the compartment and the end plate for being directed away from the linear portion in coaxial relationship therewith, the laser assembly further including a pendulum having a top end pivotally coupled about a laterally extending horizontal axis within the compartment, a bottom end having a pair of arms extending downwardly therefrom between which a free spinning spherical ball is rotatably mounted for rolling freely on the concave guide, and a pair of mirrors mounted at a right angle with respect to each other on the top end of the pendulum and directed upwardly, wherein a beam of light is emitted from the linear portion only upon the same being level such that the beam of light may reflect between both pairs of mirrors, wherein a U-shaped fastener may be removably mounted within the pin holes of the compartment for selectively maintaining the mirrors in alignment to effect the unconditional passage of the beam of light;

a sliding door slidably mounted on the end plate of the linear portion for being manually maneuvered between a first orientation with the aperture of the end plate being covered and a second orientation for opening the aperture of the end plate, thereby allowing the passage of the beam of light;

a compass mounted on one of the side plates of the linear portion adjacent the end plate for indicating a northerly direction; and a bubble level indicator mounted on a central extent of the linear portion along a longitudinal axis thereof for indicating whether the level portion is level.

2. A laser equipped level assembly comprising:

a linear member;

a laser mounted on the linear member for emitting a beam of light from the linear member; and a pendulum assembly adapted to pass the beam of light from the laser when the linear member is positioned in a level orientation and adapted to block the beam of light from the laser when the linear member is positioned in a non-level orientation, wherein the beam of light is emitted from the linear member only when the linear member is level.

3. A laser equipped level assembly as set forth in claim 2 wherein the pendulum has a mirror mounted thereon which reflects the beam of light to a mirror mounted on the linear member when the linear member is level.

4. A laser equipped level assembly as set forth in claim 2 wherein the beam of light is emitted through an aperture formed in an end plate of the linear member and further included is a cover for manually precluding the emission of the beam of light.

5. A laser equipped level assembly as set forth in claim 2 wherein a plurality of bubble indicators are mounted on the linear member.

6. A laser equipped level assembly as set forth in claim 2 wherein a lock is included for selectively precluding the pendulum from swinging.

7. A laser equipped level assembly as set forth in claim 2, and additionally comprising a right angle portion defined by a pair of interconnected members, the right angle portion being removably pivotally coupled to the linear member at an interconnection of the interconnected members of the right angle portion such that the linear portion is pivotable in a plane in which the interconnected members of the right angle portion reside.

8. A laser equipped level assembly as set forth in claim 7 wherein the linear member is coupled to the right angle portion by a pair of disks a pair of disks each having a first side face with an annular protrusion for riding in arcuate grooves formed in the linear member and the right angle portion adjacent to the interconnection, and a fastener holding the disks in position with the annular protrusions in the arcuate grooves, at least one of the disks having indicia marked thereon indicating a relative angle between positions of the linear portion and the right angle portion.

9. A laser equipped level assembly as set forth in claim 7 wherein a lasers is mounted on the linear portion and each of the interconnected members of the right angle portion, each of the lasers being adapted for emitting a beam of light therefrom.

10. A laser equipped level assembly as set forth in claim 9 wherein at least one of the lasers is removable.

11. A laser equipped level assembly as set forth in claim 2, and additionally comprising a right angle portion defined by a pair of interconnected members, the right angle portion being removably pivotally coupled to the linear member at an interconnection of the interconnected members of the right angle portion such that the linear portion is pivotable in a plane in which the interconnected members of the right angle portion reside, wherein the linear member is coupled to the right angle portion by a pair of disks a pair of disks each having a first side face with an annular protrusion for riding in arcuate grooves formed in the linear member and the right angle portion adjacent to the interconnection, and a fastener holding the disks in position with the annular protrusions in the arcuate grooves, at least one of the disks having indicia marked thereon indicating a relative angle between positions of the linear portion and the right angle portion, wherein a lasers is mounted on the linear portion and each of the interconnected members of the right angle portion, each of the lasers being adapted for emitting a beam of light therefrom, and wherein at least one of the lasers is removable.

12. A laser equipped level assembly as set forth in claim 2 wherein the pendulum has a mirror mounted thereon which reflects the beam of light to a mirror mounted on the linear member when the linear member is level, wherein the beam of light is emitted through an aperture formed in an end plate of the linear member and further included is a cover for manually precluding the emission of the beam of light, wherein a plurality of bubble indicators are mounted on the linear member, and wherein a lock is included for selectively precluding the pendulum from swinging.

* * * * *